(12) United States Patent
Hsu (10) Patent No.: US 8,786,737 B2
(45) Date of Patent: Jul. 22, 2014

(54) IMAGE CORRECTION DEVICE AND IMAGE CORRECTION METHOD

(75) Inventor: Wei Hsu, Taoyuan County (TW)

(73) Assignee: Novatek Microelectronics Corp., Hsinchu (TW)

(*) Notice: Subject to any disclaimer, the term of this patent is extended or adjusted under 35 U.S.C. 154(b) by 301 days.

(21) Appl. No.: 13/218,453

(22) Filed: Aug. 26, 2011

(65) Prior Publication Data

US 2013/0050537 A1    Feb. 28, 2013

(51) Int. Cl.
*H04N 5/217* (2011.01)
*H04N 9/64* (2006.01)
*G06K 9/40* (2006.01)
*G06K 9/32* (2006.01)

(52) U.S. Cl.
USPC ............ 348/251; 348/241; 382/274; 382/293

(58) Field of Classification Search
USPC ............... 348/222.1, 229.1, 230.1, 241, 251; 382/274–275
See application file for complete search history.

(56) References Cited

U.S. PATENT DOCUMENTS

2004/0174445 A1* 9/2004 Kawakami et al. ........... 348/251
2007/0014486 A1* 1/2007 Schiwietz et al. ............ 382/276
2008/0136939 A1  6/2008 Tamamura
2008/0137951 A1* 6/2008 Yamazoe et al. .............. 382/170
2009/0046178 A1* 2/2009 Ohara .......................... 348/241
2009/0190855 A1  7/2009 Kasahara
2011/0216959 A1* 9/2011 Kuwabara .................... 382/132
2012/0013760 A1* 1/2012 Parodi-Keravec et al. 348/222.1

FOREIGN PATENT DOCUMENTS

TW           200721853        6/2007

OTHER PUBLICATIONS

"Office Action of Taiwan Counterpart Application", issued on Aug. 29, 2013, p. 1-p. 11, in which the listed references were cited.

* cited by examiner

*Primary Examiner* — Daniel M Pasiewicz
(74) *Attorney, Agent, or Firm* — Jianq Chyun IP Office (57) ABSTRACT

An image correction device includes a coordinate transformation unit, a parameter value determination unit, and a correction value calculation unit. The coordinate transformation unit receives first coordinates of at least one pixel data of an illuminated pattern under a first coordinate system, and transforms the first coordinates into second coordinates under a second coordinate system, wherein the second coordinate system is rotated relative to the first coordinate system by an angle with respect to an optical center of the illuminated pattern. The parameter value determination unit determines a respective value of at least one correction parameter according to the position of each of the at least one pixel data in the second coordinate system. The correction value calculation unit calculates an image correction value of each of the at least one pixel data according to the second coordinates and the respective value of the at least one correction parameter.

25 Claims, 5 Drawing Sheets

IMAGE CORRECTION DEVICE AND IMAGE CORRECTION METHOD

BACKGROUND OF THE INVENTION

1. Field of the Invention

The invention relates to image correction. Particularly, the invention relates to an image correction device and an image correction method.

2. Description of Related Art

In a general image input/output device, intensity of light received by a lens can be different due to different distances between the light and a lens center, and since a typical image sensing device generally has a shape of rectangle, a problem of peripheral shading of an image is generated. A lens shading correction method is used to correct or compensate the peripheral shading. Generally, such method is to obtain a luminance variation curve of the lens by directly disposing the lens of the image input/output device in front of a parallel-light generating machine, and correct luminance unevenness of the lens center and the periphery thereof according to the luminance variation curve.

Moreover, many image input/output devices have an auto white balance (AWB) function. When a color-shift problem occurs in a captured image due to an environmental setting or different settings of an image input device, the AWB function can correct the color-shift problem of the whole image. After the white balance is performed on the image, a grayscale color of the image can become closer to a gray color.

However, the lens shading correction method is only used to balance luminance of the central and peripheral areas of an image, incapable of resolving the color-shift problem occurring in such areas of the image. Moreover, the local color-shifting problem for some images are caused not only by lens of the image input/output device, but by different combinations of systems or sensing devices. Accordingly, adjusting the lens cannot completely resolve the color-shift problem. Regarding the AWB method, it can only resolve color-shift problem of a whole image, but cannot resolve color-shift problems occurring only at certain areas of the image.

In other words, the conventional correction method cannot adjust distribution of gain compensation, thus unable to resolve the peripheral shading problem at different corners. Moreover, the conventional correction method cannot effectively resolve the local color-shift problem of the image.

In order to overcome the above problems, a quadratic function compensation method has been developed. However, a large number of calculation parameters, difficult to be set and adjusted, are needed to implement such quadratic function compensation method. In addition, accurate calculation is also required, thus greatly increasing calculation complexity. As a result, this method is not easy to be implemented in various platforms, and usually occupies a large memory space.

SUMMARY OF THE INVENTION

The invention is directed to an image correction device, which is capable of adjusting a distribution of gain values by transforming coordinates and providing correction parameters of different directions according to the transformed coordinates, so as to effectively improve evenness of image luminance. Moreover, the invention is also directed to an image sensor, an image processing device and an electronic device, which can all employ the aforementioned image correction device. In addition, the invention is also directed to an image correction method and a computer readable recording medium and a computer program product using the same.

In one implementation pattern, the invention provides an image correction device including a coordinate transformation unit, a parameter value determination unit, and a correction value calculation unit. The coordinate transformation unit receives first coordinates of at least one pixel data of an illuminated pattern under a first coordinate system, and transforms the first coordinates into second coordinates under a second coordinate system, where the second coordinate system is rotated relative to the first coordinate system by an angle with respect to an optical center of the illuminated pattern. The parameter value determination unit determines a value of at least one correction parameter for each of the at least one pixel data according to a position of each of the at least one pixel data in the second coordinate system. The correction value calculation unit calculates an image correction value of each of the at least one pixel data according to the second coordinates of each of the at least one pixel data and the value of the at least one correction parameter.

In another implementation pattern, the invention provides an image sensor including the aforementioned image correction device and an image sensing unit. The image sensing unit is used for sensing light of an image to generate image data of the illuminated pattern, and providing the image data to the image correction device, where the image data includes the aforementioned pixel data.

In another implementation pattern, the invention provides an image processing device including the aforementioned image correction device, where the image correction device is constructed in an integrated circuit. The image processing device further includes an image data receiving circuit and an image processing circuit. The image data receiving circuit is used for receiving image data of the illuminated pattern, and providing the image data to the image correction device, where the image data includes the aforementioned pixel data. The image processing circuit is coupled to at least one of the image correction device and the image data receiving circuit for performing image processing.

In another implementation pattern, the invention provides an electronic device including the aforementioned image sensor and an image processing device. The image processing device is coupled to the image sensor for receiving corrected image data provided by the image sensor and performing image processing.

In another implementation pattern, the invention provides an electronic device including the aforementioned image processing device and an image sensor. The image sensor is used for sensing light of an image to generate image data of the illuminated pattern, and providing the image data to the image processing device for post processing and correction.

In another implementation pattern, the invention provides an image correction method including following steps. First coordinates of at least one pixel data of an illuminated pattern under a first coordinate system are transformed into second coordinates under a second coordinate system, where the second coordinate system is rotated relative to the first coordinate system by an angle with respect to an optical center of the illuminated pattern. A value of at least one correction parameter is determined for each of the at least one pixel data according to a position of each of the at least one pixel data in the second coordinate system. An image correction value of each of the at least one pixel data is calculated according to the second coordinates of each of the at least one pixel data and the respective value of the at least one correction parameter.

In another implementation pattern, the invention provides a computer readable recording medium and a computer program product respectively containing a plurality of instructions that enable a processor to execute the aforementioned image correction method.

According to the above descriptions, in the image correction device and the image correction method of the invention, the image correction value of the pixel data is calculated through coordinate rotation and different correction parameters. As a result, symmetry of gain values distributed at image periphery can be increased, and luminance evenness of pixel data can be improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
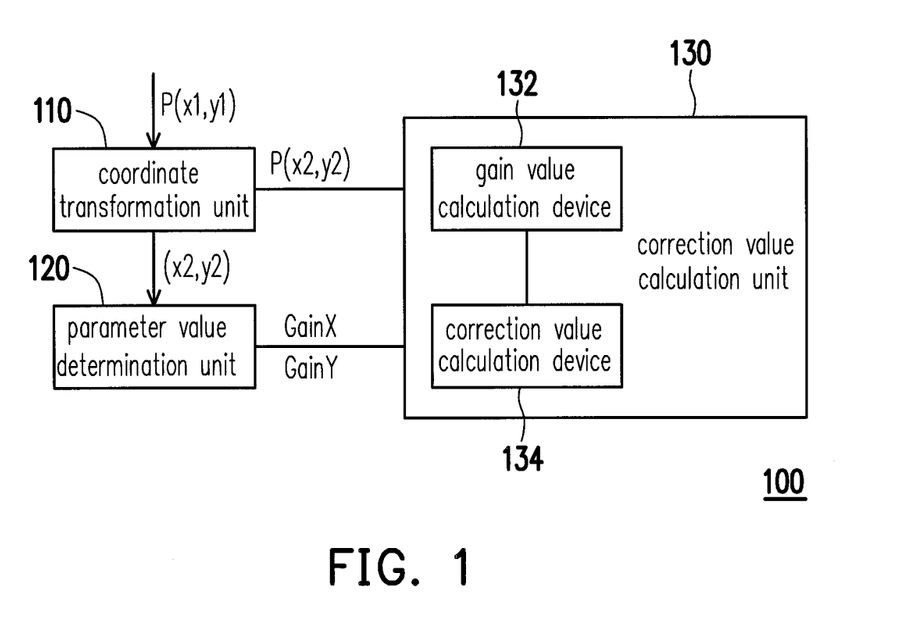
FIG. 1 is a structural block diagram of an image correction device according to an embodiment.
Figure 2:
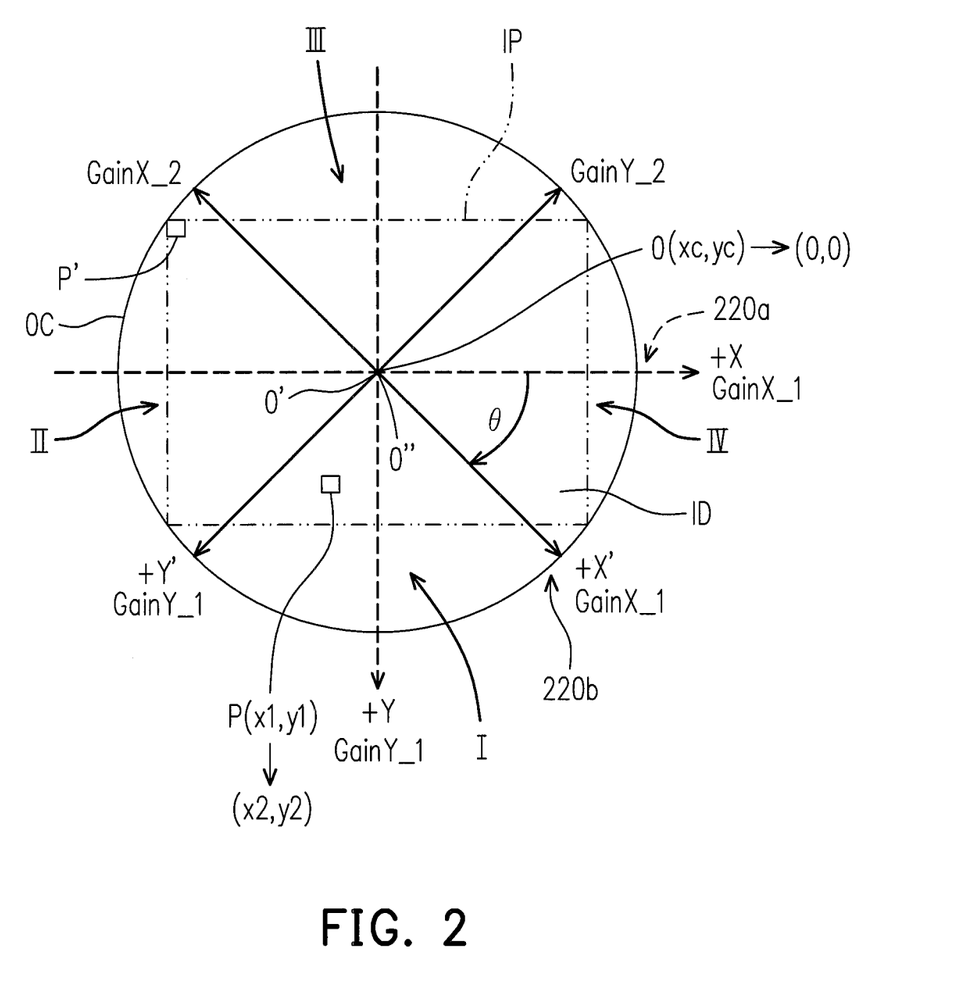
FIG. 2 is a schematic diagram of a first coordinate system and a second coordinate system according to an embodiment, for introducing a process that the image correction device of FIG. 1 corrects pixel data.

FIG. 1 is a structural block diagram of an image correction device 100 according to an embodiment. FIG. 2 is a schematic diagram of a first coordinate system and a second coordinate system according to an embodiment, introducing how the image correction device 100 corrects pixel data. A detailed structure and an operation mechanism of the image correction device 100 of the present embodiment are introduced below with reference of FIG. 1 and FIG. 2.

As shown in FIG. 1, the image correction device 100 includes a coordinate transformation unit 110, a parameter value determination unit 120, and a correction value calculation unit 130.

The coordinate transformation unit 110 receives first coordinates (x1, y1) of at least one pixel data P of an illuminated pattern OC under a first coordinate system 220a, and transforms the first coordinates (x1, y1) into second coordinates (x2, y2) under a second coordinate system 220b, which is rotated relative to the first coordinate system 220a by an angle θ with respect to an optical center O of the illuminated pattern OC.

Referring to FIG. 2, FIG. 2 also illustrates the relationship between the first coordinate system 220a and the second coordinate system 220b. As shown in FIG. 2, the illuminated pattern OC received by the coordinate transformation unit 110 can be located on an optical plane IP output by an optical device (for example, an optical lens). The optical plane IP has at least one pixel, and the illuminated pattern OC includes at least one pixel data P. Moreover, the optical plane IP has the optical center O.

In an exemplary embodiment, the optical center O can be set to be at a point with a maximum luminance value on the illuminated pattern OC obtained under uniform light; or after the illuminated pattern OC is divided into a plurality of blocks and an average luminance of each block is calculated, the optical center O can be set to be at a point with a maximum average luminance value. In other embodiments, the optical center O can be determined according to an actual design requirement through other methods.

In an exemplary embodiment, when the illuminated pattern OC generated under the uniform light roughly presents a round shape, i.e. intensities of the illuminated pattern OC evenly decrease from a center to an edge of the round, the optical center O can be set to be at the center of the round. In another exemplary embodiment, when the illuminated pattern OC roughly presents an oval shape, a center of the oval can be set as the optical center O. Moreover, due to significant device configuration difference between different products, for example, different sizes of the lens or the illuminated pattern OC, the coordinate values of the optical center O can set different.

Referring to FIG. 2, the first coordinate system 220a may have two coordinate axes X and Y extending perpendicularly to each other and intersecting at an origin O'. The coordinate axes X and Y can be, for example, directly set as a horizontal axis and a vertical axis (not shown) of the optical plane IP. The second coordinate system 220a also has two coordinate axes X' and Y' extending perpendicularly to each other and intersecting at an origin O". Preferably, the origin O" of the second coordinate system 220b can be set to be at the optical center O of the optical plane IP. Moreover, the second coordinate system 220b is rotated relative to the first coordinate system 220a by an angle θ with respect to the optical center O.

It should be noticed that in the present embodiment, since the origin O' of the first coordinate system 220a is also located at the optical center O, the origin O" of the second coordinate system 220a is just located at the optical center O without shifting the second coordinate system 220b relative to the first coordinate system 220a. However, in other embodiments, the origin O' of the first coordinate system is unnecessarily located at the optical center O, so the second coordinate system 220b needs being shifted relative to the first coordinate system 220a by a distance so as to shift the origin O" to the position of the optical center O.

The rotated angle θ can be determined according to a shape of the illuminated pattern OC so as improve symmetry of gain values, and calculation of the gain values are introduced below. In the exemplary embodiment of FIG. 2, since the illuminated pattern OC has a round shape, the rotated angle θ is preferably set to 45 degrees; and in other embodiments, if the shape of the illuminated pattern OC is an oval, the rotated angle θ can be set to 30 degrees, 60 degree or other degrees.

Referring to FIG. 2, each pixel data P has the first coordinates (x1, y1) under the first coordinate system 220a, and has the second coordinates (x2, y2) under the second coordinate system after transformation. The first coordinates of the optical center O are (xc, yc), exemplified as (0, 0) in FIG. 2; and the second coordinates of the optical center O are (0, 0). In other words, (xc, yc) represents shift amount of the second coordinate system 220b relative to the first coordinate system 220a. Relationship of the first coordinates (x1, y1) and the second coordinates (x2, y2) can be represented as follows:

$$x2 = (x1-xc) \times \cos\theta + (y1-yc) \times \sin\theta$$

$$y2 = -(x1-xc) \times \sin\theta + (y1-yc) \times \cos\theta$$

Referring to FIG. 1, the parameter value determination unit 120 determines a value of at least one correction parameter for the at least one pixel data P according to a position of the at least one pixel data P in the second coordinate system 220b.

In an embodiment, a first correction parameter GainX is provided along a first reference axis (which is preferably the coordinate axis X') of the second coordinate system 220b. The parameter value determination unit 120 can determine a value of the first correction parameter GainX according to a position (for example, a quadrant) of the second coordinates (x2, y2) in the second coordinate system 220b. In a specific embodiment, when the second coordinates (x2, y2) of the pixel data P are located in a first quadrant I or a fourth quadrant IV of the second coordinate system 220b, the parameter value determination unit 120 can determine the first correction parameter GainX to be equal to a first predetermined value GainX_1; and when the second coordinates (x2, y2) are located in a second quadrant II or a third quadrant III of the second coordinate system 220b, the parameter value determination unit 120 can determine the first correction parameter GainX to be equal to a second predetermined value GainX_2.

Similarly, in another embodiment, a second correction parameter GainY is provided along a second reference axis (which is preferably the coordinate axis Y') of the second coordinate system 220b. The parameter value determination unit 120 can determine a value of the second correction parameter GainY according to a position (for example, the quadrant) of the second coordinates (x2, y2) in the second coordinate system 220b. In a specific embodiment, when the second coordinates (x2, y2) of the pixel data P are located in the first quadrant I or the second quadrant II of the second coordinate system 220b, the parameter value determination unit 120 can determine the second correction parameter GainY to be equal to a third predetermined value GainY_1; and when the second coordinates (x2, y2) are located in the third quadrant III or the fourth quadrant IV of the second coordinate system 220b, the parameter value determination unit 120 can determine the second correction parameter GainY to be equal to a fourth predetermined value GainY_2.

In a preferable embodiment, the above two embodiments can be combined. In other words, the first and the second correction parameters GainX and GainY can be respectively provided along two different reference axes. In the embodiment of FIG. 2, since the second coordinates (x2, y2) are located in the first quadrant I, the parameter value determination unit 120 can set the first correction parameter GainX and the second correction parameter GainY as the first predetermined value GainX_1 and the third predetermined value GainY_1, respectively.

The first predetermined value to the fourth predetermined value GainX_1, GainX_2, GainY_1 and GainY_2 can be set according to luminance distribution of the illuminated pattern OC obtained under the uniform light, so as to improve symmetry of gain values, and calculations of the gain values are introduced below. Since different lenses may cause different attenuations, the first predetermined value to the fourth predetermined value GainX_1, GainX_2, GainY_1 and GainY_2 are also different.

It should be noticed that although the first and the second correction parameters GainX and GainY are respectively provided along two different reference axes, and the second coordinate system 220b is divided into four quadrants to determine the values of the correction parameters, the invention is not limited thereto. For example, the second coordinate system 220b can be divided into a plurality of regions, and each region is correlated to a different value of the at least one correction parameter. According to a region where the at least one pixel data P locates, the correction value calculation unit 130 determines the value of the at least one correction parameter to be a value associated with the region. In an embodiment, more correction parameters can be provided along different reference axes passing through the optical center O, so as to achieve more accurate correction.

The correction value calculation unit 130 calculates an image correction value of the at least one pixel data P according to the second coordinates (x2, y2) of the at least one pixel data P and the determined value of the at least one correction parameter (for example, the first correction parameter GainX and the second correction parameter GainY).

In an embodiment, the correction value calculation unit 130 includes a gain value calculation device 132 and a correction value calculation device 134. The gain value calculation device 132 calculates a gain value Gain of the pixel data P according to the second coordinates (x2, y2) and the determined value of the at least one correction parameter (for example, the first correction parameter GainX and the second correction parameter GainY). The correction value calculation device 134 calculates the image correction value according to an original image value of the pixel data P and the gain value Gain.

In an embodiment, the gain value calculation device 132 respectively multiplies an absolute value of the x-axis coordinate x2 and an absolute value of the y-axis coordinate y2 of the second coordinates (x2, y2) by the determined value of the first correction parameter GainX and the determined value of the second correction parameter GainY, so as to obtain the gain value Gain. Mathematically, the gain value Gain can be represented by a following equation:

$$\text{Gain}=[(\text{GainX}\times|x2|)^2+(\text{GainY}\times|y2|)^2+2]\div2 \quad (1)$$

Then, the correction value calculation device 134 calculates the image correction value I1 according to an original image value I0 of the pixel data P and the gain value Gain, i.e.:

$$I1=I0\times\text{Gain} \quad (2)$$

Where, the original image value I0 is, for example, original luminance of the pixel data P.

According to the equations (1) and (2), it is known that the gain value Gain corresponding to the pixel data P is increased as the distance between the pixel data P and the optical center O increases. Namely, the further the pixel data P on the optical plane IP departed from the optical center O is, the higher the corresponding gain value Gain is, so that the image correction device 100 of the present embodiment can effectively mitigate the conventional peripheral shading problem of the image.

It should be noticed that methods of calculating the gain value Gain and the image correction value I1 are not limited to the equations (1) and (2), and in other embodiments, the methods of calculating the gain value Gain and the image correction value I1 are varied according to actual situations. For example, constants can be added to the equations (1) and (2) in calculation.

It should be noticed that only after the coordinate system is rotated, one of the effects of the gain values of improving symmetry of the gain values distributed at image periphery is implemented, and the peripheral shading problem of the image is effectively corrected. In detail, taking the equation (1) as an example, if the gain values are directly obtained according to the un-rotated coordinate system, the gain values obtained according to the equation (1) generally have asymmetric distribution at image periphery, especially, the gain values of the four corners are obviously low. However, after the coordinate system is rotated, the gain values obtained according to the equation (1) are not excessively low at the four corners of the image, i.e. symmetry of the gain values distributed at image periphery is improved. Therefore, the gain values under the rotated coordinate system can effectively correct the peripheral shading problem of the whole image.

Figure 3:
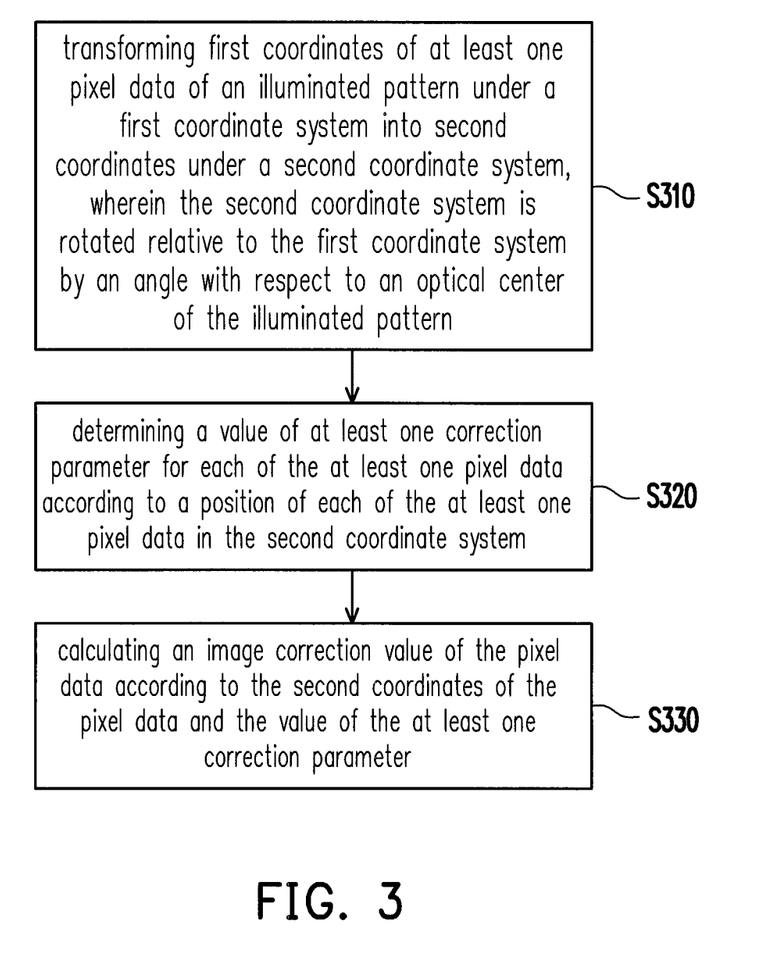
FIG. 3 is a flowchart illustrating an image correction method according to an embodiment.

FIG. 3 is a flowchart illustrating an image correction method according to an embodiment. Referring to FIG. 2 and FIG. 3, a coordinate transformation step is first performed (step S310), by which the first coordinates (x1, y1) of at least one pixel data P of the illuminated pattern OC under the first coordinate system 220a are transformed into the second coordinates (x2, y2) under the second coordinate system 220b, where the second coordinate system 220b is rotated relative to the first coordinate system 220a by the angle θ with respect to the optical center O of the illuminated pattern OC. Then, a parameter value determination step is performed (step S320), by which a value of at least one correction parameter is determined for the at least one pixel data P according to a position of the at least one pixel data P in the second coordinate system 220b. Then, a correction value calculation step is performed (step S330), by which an image correction value of the at least one pixel data P is calculated according to the second coordinates (x2, y2) of the at least one pixel data P and the value of the at least one correction parameter. Details of the steps S310, S320 and S330 are respectively similar to the operations of the coordinate transformation unit 110, the parameter value determination unit 120, and the correction value calculation unit 130 of FIG. 1, and for simplicity's sake, details thereof are not repeated.

It should be noticed that the image correction device and the image correction method can be respectively implemented in different patterns. For example, in an embodiment, a computer readable recording medium may contain a plurality of instructions that enable a processor (for example, a central processing unit (CPU)) to execute the image correction method of FIG. 3. The computer readable medium is, for example, a read only memory, a flash memory, a soft disc, a hard disc, a compact disc, a flash drive, a tape, a database accessed through network, or any other storage medium known by those skilled in the art.

Moreover, in another embodiment, the image correction method of FIG. 3 can also be implemented by a computer program product. After a computer loads the computer program product and executes a plurality of instructions contained in the computer program product, the image correction method can be implemented. The computer program product can be stored in a computer readable recording medium. Moreover, the computer program product can also be transmitted through a network.

Figure 4A:
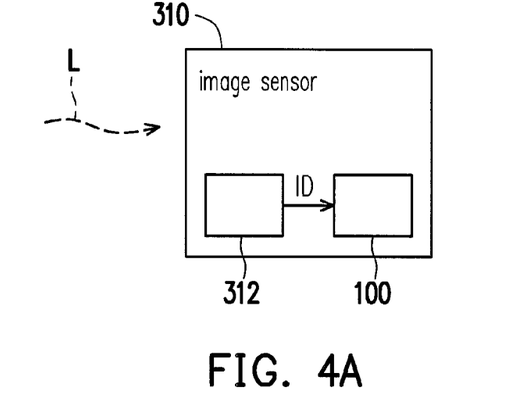
FIGS. 4A-4C are structural block diagrams respectively illustrating an image sensor, an image processing device and an electronic device according to an embodiment.

FIG. 4A is a diagram of an image sensor 310 configured with the image correction device 100 of FIG. 1. In addition to the image correction device 100, the image sensor 310 further includes an image sensing unit 312 coupled to the image correction device 100. The image sensing unit 312 senses light L of an image, performs photoelectric conversion to generate image data ID of an illuminated pattern, and then provides image data ID to the image correction device 100, wherein the image data ID includes the aforementioned at least one pixel data P. The image sensor 310 is, for example, a complementary metal oxide semiconductor (CMOS) sensor, such as a RGB Bayer pattern COMS sensor that generates different image data in response to red light, green light and blue light. Preferably, the image sensor 310 is implemented as an integrated circuit (IC) into which the image correction device 100 and the image sensing unit 312 can be integrated.

Figure 4B:
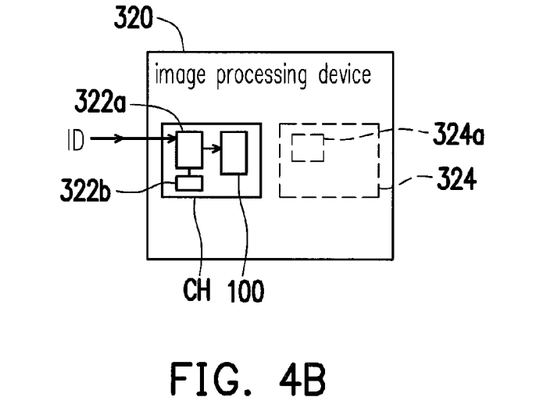

FIG. 4B is a structural block diagram of an image processing device 320 configured with the image correction device 100 of FIG. 1. In an embodiment, the image processing device 320 includes an image processing chip CH including the integrated image correction device 100, an image data receiving circuit 322a and an image processing circuit 322b. Namely, the image correction device 100 is constructed in an integrated circuit (IC). The image data receiving circuit 322a receives image data ID of an illuminated pattern, and provides the image data ID to the image correction device 100. The image processing circuit 322b is coupled to at least one of the image correction device 100 and the image data receiving circuit 322a for performing image processing.

In another embodiment, in addition to the image processing chip CH, the image processing device 320 further includes a CPU 324 used for controlling operations of the image processing chip CH. The CPU 324 may include image correction software 324a, and the image processing chip CH may not include the image correction device 100. In other words, the image correction software 324a is used to replace the operation of the image correction device 100.

Figure 4C:
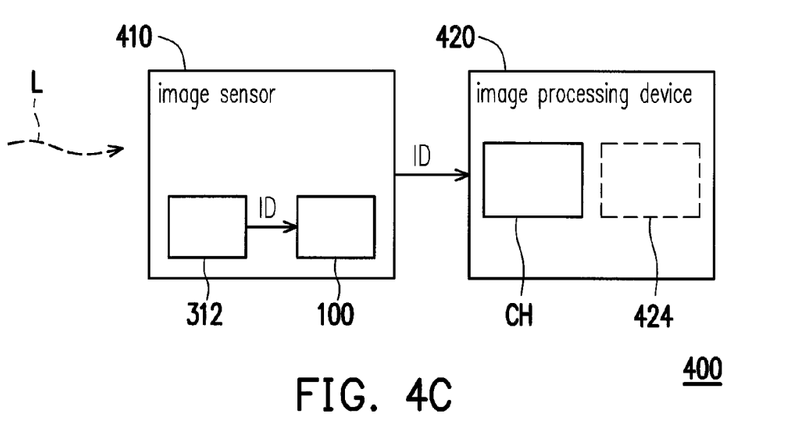

FIG. 4C is a structural block diagram of an electronic device configured to have the image correction device 100 of FIG. 1 or realize the image correction method of FIG. 3. The electronic device is, for example, a digital camera, a mobile phone camera, a handheld camera or any image capturing device. As shown in FIG. 4C, the electronic device 400 may include an image sensor 410 and an image processing device 420, where the image processing device 420 includes an image processing chip CH and a CPU 424 (which is, for example, a control unit). In an embodiment, the image sensor 410 has a configuration as that shown in FIG. 4A. In another embodiment, the image processing device 420 has a configuration as that shown in FIG. 4B. In still another embodiment, the CPU 424 can execute software containing a plurality of instructions used for implementing the image processing method of FIG. 3.

It should be noticed that in a case where the image correction device is configured with a RGB Bayer pattern COMS sensor, image data of different colors can be respectively corrected, so as to mitigate a whole color shift problem of complete image data.

Figure 5A:
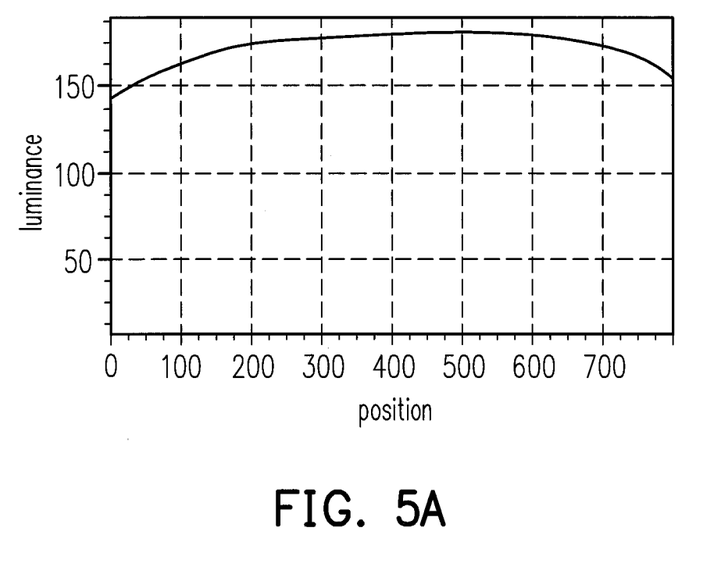
FIG. 5A is an experiment diagram of pixel data before correction according to an embodiment.
Figure 5B:
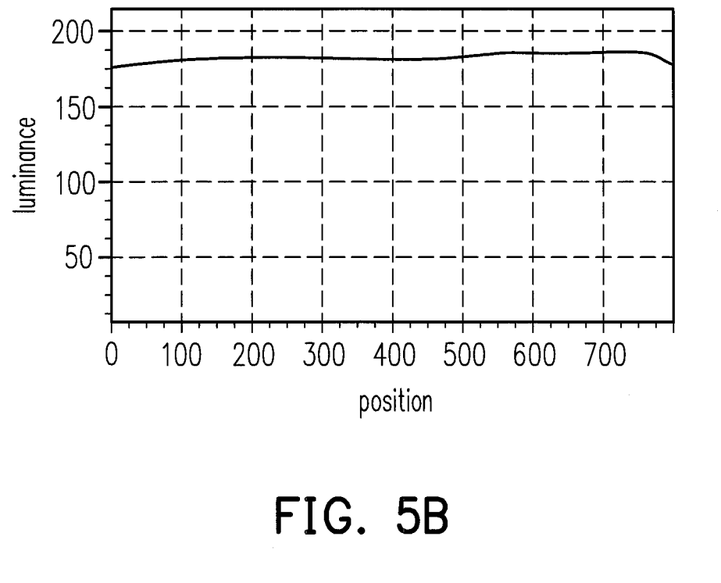
FIG. 5B is an experiment diagram of pixel data after correction according to an embodiment of the invention.

FIG. 5A and FIG. 5B are experimental comparison diagrams of pixel data before and after correction according to an embodiment. FIG. 5A is a curve diagram of original image value of pixel data before correction, and FIG. 5B is a curve diagram of image correction value of pixel data after correction, where a vertical axis represents luminance of pixel data, and a horizontal axis represents positions of pixel data on the optical plane IP.

According to FIG. 5A, it is observed that before image correction, the original image values at two sides of the horizontal axis are smaller than the original image value in the middle of the horizontal axis, i.e. the pixel data P has the problem of uneven luminance before the correction.

However, after the aforementioned image correction procedure, the image correction value curve of FIG. 5B is obtained. It is observed that the luminance distribution of the pixel data at different positions is more even than that shown in FIG. 5A. Therefore, by using the aforementioned coordinate transformation method to adjust the gain values of the pixel data P at different positions, luminance evenness of the whole image data can be effectively improved.

In summary, in the image correction device and the image correction method, through coordinate transformation, different correction parameters can be used to determine gain values of pixel data along different directions, thus effectively improving symmetry of gain values distributed in the peripheral area of an image and effectively reducing color-shift phenomenon of the image data or resolving the peripheral shading problem. Besides, calculation complexity and total number of used parameters can be reduced, allowing the image correction device and the image correction method to be easily integrated with various platforms, and reducing the required memory space.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image correction device, comprising:
 a coordinate transformation unit, receiving first coordinates of at least one pixel data of an illuminated pattern under a first coordinate system, and transforming the first coordinates into second coordinates under a second coordinate system, wherein the second coordinate system is rotated relative to the first coordinate system by an angle with respect to an optical center of the illuminated pattern, wherein the angle is determined according to a shape of the illuminated pattern;
 a parameter value determination unit, determining a respective value of at least one correction parameter for each of the at least one pixel data according to a position of each of the at least one pixel data in the second coordinate system; and
 a correction value calculation unit, calculating an image correction value of each of the at least one pixel data according to the second coordinates of each of the at least one pixel data and the respective value of the at least one correction parameter.

2. The image correction device as claimed in claim 1, wherein the second coordinate system is shifted relative to the first coordinate system by a distance such that the optical center serves as an origin of the second coordinate system.

3. The image correction device as claimed in claim 1, wherein
 the second coordinate system is divided into a plurality of regions, and different regions are associated with different values of the at least one correction parameter, and
 the parameter value determination unit determines the respective value of the at least one correction parameter corresponding to the at least one pixel data to be the value associated with the region where the at least one pixel data locates.

4. The image correction device as claimed in claim 1, wherein
 the at least one correction parameter comprises a first correction parameter,
 when the second coordinates are located at a first quadrant or a fourth quadrant of the second coordinate system, the parameter value determination unit determines the first correction parameter to be a first predetermined value, and
 when the second coordinates are located at a second quadrant or a third quadrant of the second coordinate system, the parameter value determination unit determines the first correction parameter to be a second predetermined value.

5. The image correction device as claimed in claim 1, wherein
 the at least one correction parameter comprises a second correction parameter,
 when the second coordinates are located at a first quadrant or a second quadrant of the second coordinate system, the parameter value determination unit determines the second correction parameter to be a third predetermined value, and
 when the second coordinates are located at a third quadrant or a fourth quadrant of the second coordinate system, the parameter value determination unit determines the second correction parameter to be a fourth predetermined value.

6. The image correction device as claimed in claim 3, wherein
 the at least one correction parameter comprises a second correction parameter,
 when the second coordinates are located at a first quadrant or a second quadrant of the second coordinate system, the parameter value determination unit determines the second correction parameter to be a third predetermined value, and
 when the second coordinates are located at a third quadrant or a fourth quadrant of the second coordinate system, the parameter value determination unit determines the second correction parameter to be a fourth predetermined value.

7. The image correction device as claimed in claim 1, wherein a relationship of the first coordinates and the second coordinates of the at least one pixel data is:

$$x2=(x1-xc)\times\cos\theta+(y1-yc)\times\sin\theta$$

$$y2=(x1-xc)\times\sin\theta+(y1-yc)\times\cos\theta$$

wherein $\theta$ is the angle, (x1, y1) are the first coordinates, (x2, y2) are the second coordinates, and (xc, yc) are first coordinates of the optical center.

8. The image correction device as claimed in claim 1, wherein the correction value calculation unit calculates a gain value of each of the at least one pixel data according to the second coordinates of each of the at least one pixel data and the determined value of the at least one correction parameter, and calculates the image correction value of each of the at least one pixel data according to an original image value and the gain value of each of the at least one pixel data.

9. The image correction device as claimed in claim 8, wherein the correction value calculation unit respectively multiplies an absolute value of a first-axis coordinate and an absolute value of a second-axis coordinate of the second coordinates by a value of a first correction parameter and a value of a second correction parameter, so as to obtain the gain value.

10. An image sensor, comprising:
 the image correction device as claimed in claim 1; and
 an image sensing unit, sensing light of an image to generate image data of the illuminated pattern, and providing the image data to the image correction device, wherein the image data comprises the at least one pixel data.

11. An image processing device, comprising:
 the image correction device as claimed in claim 1, wherein the image correction device is constructed in an integrated circuit and comprises;
 an image data receiving circuit, receiving image data of the illuminated pattern, and providing the image data to the image correction device, wherein the image data comprises the at least one pixel data; and an image processing circuit, coupled to at least one of the image correction device and the image data receiving circuit for performing image processing.

12. The image processing device as claimed in claim 11, wherein the image processing device comprises an image processing chip which comprises the image correction device, the image data receiving circuit and the image processing circuit integrated thereon.

13. An electronic device, comprising:
the image sensor as claimed in claim 10; and
an image processing device, coupled to the image sensor, receiving corrected image data provided by the image sensor and performing image processing.

14. An electronic device, comprising:
the image processing device as claimed in claim 11; and
an image sensor, sensing light of an image to generate image data of the illuminated pattern, and providing the image data to the image processing device for post processing and correction.

15. An image correction method, comprising:
transforming first coordinates of at least one pixel data of an illuminated pattern under a first coordinate system into second coordinates under a second coordinate system, wherein the second coordinate system is rotated relative to the first coordinate system by an angle with respect to an optical center of the illuminated pattern, wherein the angle is determined according to a shape of the illuminated pattern;
determining a respective value of at least one correction parameter for each of the at least one pixel data according to a position of each of the at least one pixel data in the second coordinate system; and
calculating an image correction value of each of the at least one pixel data according to the second coordinates of each of the at least one pixel data and the respective value of the at least one correction parameter.

16. The image correction method as claimed in claim 15, further comprising determining a position of the optical center and at least one predetermined value of the at least one correction parameter according to light intensity distribution of an optical plane under an even light.

17. The image correction method as claimed in claim 15, wherein the second coordinate system is shifted relative to the first coordinate system by a distance to have the optical center serving as an origin thereof.

18. The image correction method as claimed in claim 15, wherein
the second coordinate system is divided into a plurality of regions, and different regions are associated with different values of the at least one correction parameter, and
the value of the at least one correction parameter corresponding to the at least one pixel data is determined to be the value associated with the region where the at least one pixel data locates.

19. The image correction method as claimed in claim 15, wherein
the at least one correction parameter comprises a first correction parameter,
the step of determining the value of the at least one correction parameter comprises:
determining the first correction parameter to be a first predetermined value when the second coordinates are located at a first quadrant or a fourth quadrant of the second coordinate system; and
determining the first correction parameter to be a second predetermined value when the second coordinates are located at a second quadrant or a third quadrant of the second coordinate system.

20. The image correction method as claimed in claim 15, wherein
the at least one correction parameter comprises a second correction parameter,
the step of determining the value of the at least one correction parameter comprises:
determining the second correction parameter to be a third predetermined value when the second coordinates are located at a first quadrant or a second quadrant of the second coordinate system; and
determining the second correction parameter to be a fourth predetermined value when the second coordinates are located at a third quadrant or a fourth quadrant of the second coordinate system.

21. The image correction method as claimed in claim 19, wherein
the at least one correction parameter comprises a second correction parameter,
the step of determining the value of the at least one correction parameter comprises:
determining the second correction parameter to be a third predetermined value when the second coordinates are located at a first quadrant or a second quadrant of the second coordinate system; and
determining the second correction parameter to be a fourth predetermined value when the second coordinates are located at a third quadrant or a fourth quadrant of the second coordinate system.

22. The image correction method as claimed in claim 15, wherein a relationship of the first coordinates and the second coordinates of the at least one pixel data is:

$x2=(x1-xc)\times\cos\theta+(y1-yc)\times\sin\theta$ $y2=-(x1-xc)\times\sin\theta+(y1-yc)\times\cos\theta$ wherein $\theta$ is the angle, (x1, y1) are the first coordinates, (x2, y2) are the second coordinates, and (xc, yc) are first coordinates of the optical center.

23. The image correction method as claimed in claim 15, wherein the step of calculating the image correction value of each of the at least one pixel data comprises:
calculating a gain value of each of the at least one pixel data according to the second coordinates of each of the at least one pixel data and the determined value of the at least one correction parameter; and
calculating the image correction value of each of the at least one pixel data according to an original image value and the gain value of each of the at least one pixel data.

24. The image correction method as claimed in claim 23, wherein the step of calculating the image correction value of each of the at least one pixel data comprises respectively multiplying an absolute value of a first-axis coordinate and an absolute value of a second-axis coordinate of the second coordinates by a value of a first correction parameter and a value of a second correction parameter, so as to obtain the gain value.

25. A non-transitory computer readable recording medium, comprising a plurality of instructions that enable a processor to execute the image correction method as claimed in claim 15.

* * * * *